No. 770,452. PATENTED SEPT. 20, 1904.
H. CARSTENS.
VAGINAL SYRINGE.
APPLICATION FILED MAY 27, 1904.
NO MODEL.
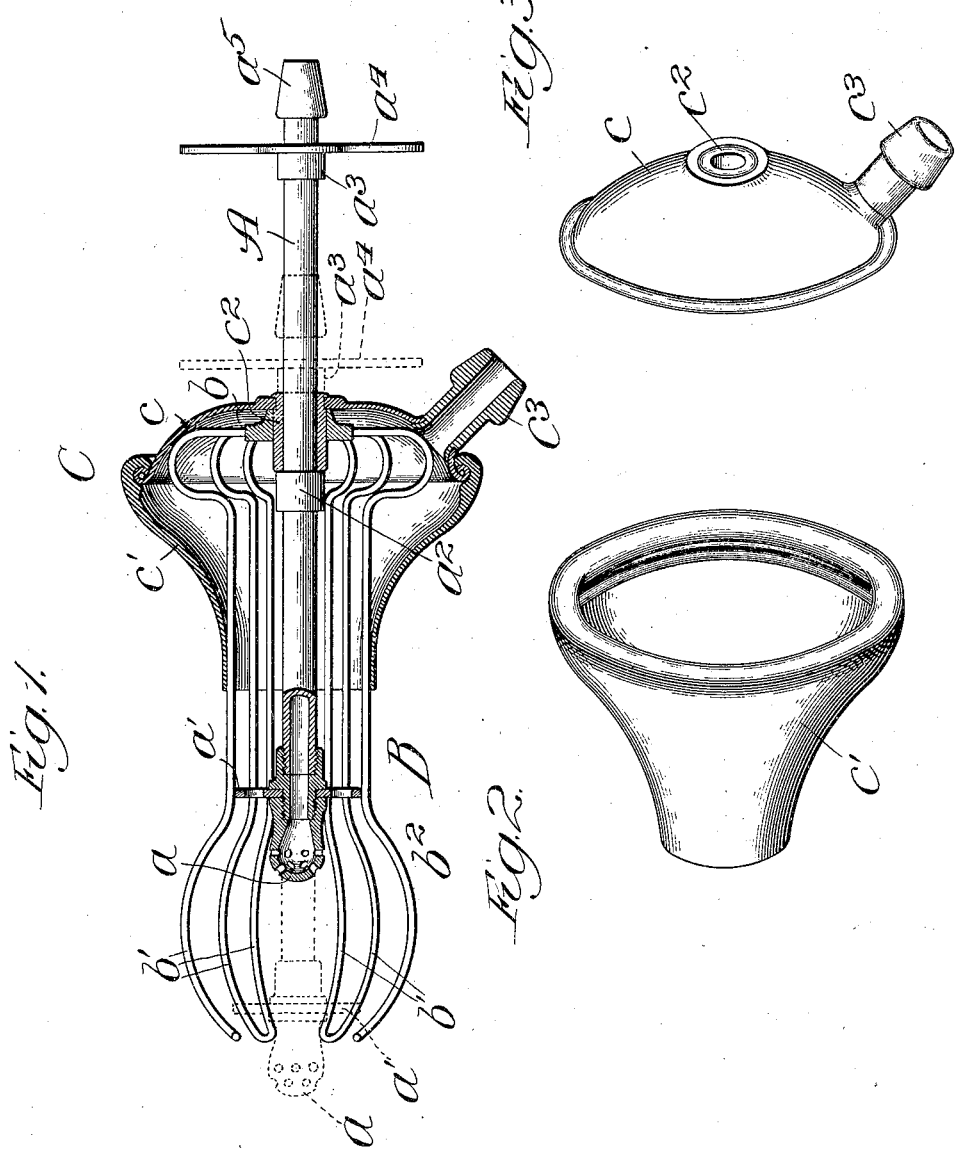
Witnesses:
Chas. E. Gaylord.
John Enders.
Inventor:
Henry Carstens,
By Dyrenforth, Dyrenforth & Lee,
Attys.

No. 770,452. Patented September 20, 1904.

UNITED STATES PATENT OFFICE.

HENRY CARSTENS, OF CHICAGO, ILLINOIS.

VAGINAL SYRINGE.

SPECIFICATION forming part of Letters Patent No. 770,452, dated September 20, 1904.

Application filed May 27, 1904. Serial No. 210,039. (No model.)

*To all whom it may concern:*

Be it known that I, HENRY CARSTENS, a citizen of the United States, residing at Chicago, in the county of Cook and State of Illinois, have invented a new and useful Improvement in Vaginal Syringes, of which the following is a specification.

My invention relates particularly to vaginal syringes equipped with means for expanding the vaginal walls to insure thoroughness of operation; and my primary object is to provide a syringe of this character which is thoroughly practical in its construction and which is equipped with means providing for a return flow of the cleansing or healing solution.

The invention is illustrated in the accompanying drawings, in which—

Figure 1 represents a longitudinal sectional view of a syringe embodying my improvements; Fig. 2, a perspective view of a conical soft-rubber shield constituting a portion of the collecting-chamber for the return fluid, and Fig. 3 a perspective view of a metallic member constituting the base portion of said chamber.

In the preferred construction, A represents a metallic tube provided with a spray-head $a$ and adjacent thereto with a washer or expander $a'$; B, a vaginal expander, comprising a plurality of spring-wire members which normally are in a collapsed or non-expanded condition, (not shown,) in which condition they form a hollow insertible member of general conical shape, and C a return-flow collecting-chamber inclosing the base portion of the expander B. The tube A is equipped with washers or packing-rings $a^2$ $a^3$, an operating-handle $a^4$, and a hose-connecting nipple $a^5$. The member B comprises a base-ring $b$ and spring-wire members $b'$, each formed by bending a wire at its central portion, giving the proper curvature to its parts, and inserting its ends into radial holes in the member $b$. Near the apex of the expander B the members $b'$ are curved outwardly to form an enlargement $b^2$, within which the member $a'$ works. The chamber or casing C comprises a dished metallic base member $c$ and a hollow frusto-conical soft-rubber member $c'$, having its large end embracing a peripheral flange on the member $c$ and its small end embracing the members $b'$ of the expander B. The member $c$ is centrally perforated and brazed or otherwise tightly secured on a short sleeve or tubular slide $c^2$, which moves on the tube A. The sleeve $c^2$ receives the ring $b$ removably upon it, and when the members $c$ and $c'$ are coupled by their flanged connection the parts are secured to move as a unit on the tube A. The member $c$ is provided near its periphery with a hose-attaching nipple $c^3$, which receives a return-flow hose. (Not shown.)

In use the tube A may be retracted to distend the vaginal expander, as shown in full lines in Fig. 1, in which case the packing-ring $a^2$ is in contact with the sleeve $c^2$, or the tube A may be advanced to the position shown in dotted lines to distend the expander and bring the spray-head to a new position, in which case the packing-ring $a^3$ will be in contact with the sleeve $c^2$. In either case a tight joint is provided at the tube A. As shown, the large end of the member $c'$ is of thicker rubber than the small end thereof and is internally grooved to form a close and secure connection with the flange of the member $c$. On the other hand, the elasticity of the inner end of the member $c'$ enables it to accommodate itself to the body of the expander B regardless of the condition of the latter. Moreover, the member $c'$ presents a yielding surface to the vaginal walls, insuring a return flow of all the liquid through the chamber C. A feature not heretofore explained, but which is regarded as an important one, is that the return-flow passage is larger than the ingress-passage, so that the chamber C will be properly drained and cannot become filled. It will be understood that when the washer $a'$ is centrally located with relation to the enlargement $b^2$ the expander collapses, permitting insertion into or withdrawal from the vaginal cavity.

Minor changes in details of construction may be made. Hence no undue limitation should be understood from the foregoing detailed description.

The construction enables ready assemblage and disassemblage for cleansing purposes, as will be readily understood.

What I regard as new, and desire to secure by Letters Patent, is—

1. The combination of a spray-tube equipped with an expander device, a vaginal expander longitudinally movable with relation to said tube, and a two-part casing enveloping the base of said vaginal expander and binding the casing to the base portion of the expander, for the purpose set forth.

2. The combination of a spray-tube equipped with two suitably-spaced packing-rings and with means for opening an expander, a vaginal expander comprising spring-wire members and a ring with which said members are connected, and a casing comprising a dished base member equipped with a sleeve removably receiving said ring, and a frusto-conical yielding shield connected with said base member, for the purpose set forth.

3. The combination of a spray-tube, an expander, and a casing comprising a circular dished member and a hollow frusto-conical shield of rubber having a flanged thickened large end engaging the periphery of said circular member and a relatively thin elastic small end encircling the body of said expander, for the purpose set forth.

4. The combination of a spray-tube, a vaginal expander movable with relation thereto, and a collecting-chamber enveloping the base portion of said expander and having a hollow yielding frusto-conical portion adapted to make close contact with the vaginal walls, for the purpose set forth.

HENRY CARSTENS.

In presence of—
F. M. WIRTZ,
WALTER N. WINBERG.